(12) United States Patent
Tanaka et al.

(10) Patent No.: US 8,227,045 B2
(45) Date of Patent: Jul. 24, 2012

(54) PROCESS FOR ROLLER-COATING A BEARING

(75) Inventors: Takuya Tanaka, Inuyama (JP); Masahito Fujita, Inuyama (JP)

(73) Assignee: Daido Metal Company Ltd., Nagoya (JP)

( * ) Notice: Subject to any disclaimer, the term of this patent is extended or adjusted under 35 U.S.C. 154(b) by 1155 days.

(21) Appl. No.: 12/055,402

(22) Filed: Mar. 26, 2008

(65) Prior Publication Data
US 2008/0241376 A1 Oct. 2, 2008

(30) Foreign Application Priority Data

Mar. 26, 2007 (JP) .................................. 2007-078948

(51) Int. Cl.
*B05D 1/28* (2006.01)
*B05D 7/00* (2006.01)

(52) U.S. Cl. .............. 427/428.01; 427/230; 427/428.06; 427/428.12; 427/428.14; 427/428.15

(58) Field of Classification Search .......... 427/230–239, 427/428.01, 428.02, 428.06, 428.11, 428.12, 427/428.14, 428.15, 428.16, 428.17, 428.21
See application file for complete search history.

(56) References Cited

U.S. PATENT DOCUMENTS
2004/0062860 A1 * 4/2004 Nakashima et al. .......... 427/233
2004/0081755 A1 * 4/2004 Iwata et al. .................... 427/230

FOREIGN PATENT DOCUMENTS
JP 2001-304264 A * 10/2001
JP 2001304264 10/2001
KR 1987-0010333 * 11/1987

* cited by examiner

*Primary Examiner* — William Phillip Fletcher, III
(74) *Attorney, Agent, or Firm* — Browdy and Neimark, PLLC

(57) ABSTRACT

A transfer roll rotates to have a coating liquid in a coating liquid tank filled in recesses formed on a roll surface thereof and to have a surplus coating liquid scraped off by a doctor blade, and rotates contacting with a coating roll. Thereby, the coating liquid in the recesses of the transfer roll is transferred to the coating roll. Thereafter, while the transfer roll is moved upward, an arm is rotated counterclockwise whereby the coating roll is separated from the transfer roll. The arm is further rotated whereby the coating roll is moved along an inner surface of a half bearing fixed to a jig and the coating roll applies the coating liquid to the inner surface of the half bearing.

6 Claims, 4 Drawing Sheets

PROCESS FOR ROLLER-COATING A BEARING

BACKGROUND OF THE INVENTION

The present invention relates to a coated bearing manufacturing method of and a coated bearing manufacturing apparatus for forming a coating layer on a bearing base material, and more particular, to a method of and an apparatus for forming a coating layer on an inner surface of a cylindrical-shaped or semicylindrical-shaped bearing base material with the use of a coating roll.

Ordinarily, a coating layer of a coated bearing is formed by using a coating liquid obtained by mixing a thermosetting resin such as polyimide resin (PI), epoxy resin, phenol resin, etc. with a solid lubricant such as molybdenum disulfide ($MoS_2$), graphite (Gr), etc. and applying the coating liquid to an inner surface of a bearing base material.

Ways to apply a coating liquid to an inner surface of a bearing base material include a spraying method or a printing method. The spraying method comprises jetting a coating liquid in a foggy manner from a spraying device to apply the same to an inner surface of a bearing base material and the printing method comprises using a pad or a roll to apply a coating liquid to an inner surface of a bearing base material.

JP-A-2001-304264 discloses a method of forming a coating layer on an inner surface of a half bearing in printing (referred below to as rolling printing), in which a roll is used. In the method, there are provided a transfer roll, a coating roll (printing roll), and a backup roll. In order to form a coating layer, a coating liquid is first dropped on a roll surface of a transfer roll and a coating roll is rotationally brought into contact with the transfer roll whereby the coating liquid is transferred in uniform thickness to the coating roll. Succeedingly, a half bearing (bearing base material) is interposed between the coating roll and the backup roll and the both rolls are rotated. Thereby, the bearing base material passes between the both rolls and in the passing process, the coating liquid on the coating roll is applied to an inner surface of the half bearing.

The spraying method involves a large dispersion in created film thickness and an amount of a coating liquid, which is scattered and wasted, is much since the coating liquid is jetted in a foggy manner from the spraying device. In the printing method, an amount of a coating liquid wasted as in the spraying method can be made small. In the printing method, in which a pad is used, however, a coating layer is bad in thickness accuracy since the pad is pushed against an inner surface of a half bearing to apply a coating liquid thereto.

The printing method, in which a roll is used, shown in JP-A-2001-304264 is excellent in thickness accuracy as compared with the pad printing. In the rolling printing method in JP-A-2001-304264, a transfer roll and a coating roll are rotationally brought into contact with each other, that is, contact pressure between the transfer roll and the coating roll causes a coating liquid to spread over a surface of the coating roll. In a system, in which contact pressure between the both rolls causes a coating liquid to spread, however, it is difficult to control a coating liquid to make the same constant in thickness over a whole periphery of the coating roll. Therefore, in the case where the coating liquid spread over a surface of the coating roll is applied to an inner surface of a half bearing to form a coating layer, the coating layer is liable to become ununiform in thickness.

Also, in order to interpose a half bearing between a coating roll and a backup roll to apply a coating to an inner surface of the half bearing, it is necessary to separate; the coating roll from a transfer roll to move the same near the backup roll. When the coating roll is separated from the transfer roll, however, a coating liquid is drawn to a portion thereof, which has been in contact with the transfer roll, to stay there with the result that there is caused a problem that in case of applying a coating liquid to a half bearing, a coating layer becomes locally and partially large in thickness.

SUMMARY OF THE INVENTION

The invention has been thought of in view of the situation and has its object to provide a coated bearing manufacturing method and a coated bearing manufacturing apparatus, in which it is possible to uniformly transfer a coating liquid to a surface of a coating roll and it is possible to form a coating layer of uniform thickness on a bearing base material without generation of a portion, in which the coating liquid stays, on the coating roll when the coating roll and a transfer roll are separated from each other.

The invention provides a coated bearing manufacturing method of applying a coating liquid to an inner surface of a cylindrical-shaped or semicylindrical-shaped bearing base material to form a coating layer, the method comprising: adhering the coating liquid to a roll surface of a transfer roll, which roll surface is formed with a multiplicity of recesses, and using a doctor blade to remove a surplus coating liquid from the roll surface; thereafter rotating the transfer roll and a coating roll, while bringing the rolls into contact with each other, to transfer the coating liquid on the transfer roll to the coating roll; moving the coating roll relative to the transfer roll in a direction of rotation of the coating roll in a region in contact with the transfer roll while moving the transfer roll relative to the coating roll in a radial direction, which passes through a contact region of the transfer roll and the coating roll; whereby the transfer roll and the coating roll are separated from each other to terminate transfer of the coating liquid to the coating roll from the transfer roll; and thereafter bringing the coating roll into contact with the inner surface of the bearing base material and moving the coating roll along the inner surface of the bearing base material while causing the coating roll to rotate on its own axis in the state of contact, whereby the coating liquid transferred to the coating roll is applied to the inner surface of the bearing base material to form the coating layer.

Also, the invention provides a coated bearing manufacturing apparatus for applying a coating liquid to an inner surface of a cylindrical-shaped or semicylindrical-shaped bearing base material to form a coating layer, the apparatus comprising: a transfer roll, a roll surface of which is formed with a multiplicity of recesses; coating liquid supply means, which supplies the coating liquid to the roll surface of the transfer roll in a state, in which the transfer roll is rotated; a doctor blade, which removes a surplus coating from the roll surface of the transfer roll; a coating roll, which rotates in being contact with the transfer roll to permit the coating liquid to be transferred thereto from the roll surface of the transfer roll; separation means, which moves the coating roll relative to the transfer roll in a direction of rotation of the coating roll in a region in contact with the transfer roll while moving the transfer roll relative to the coating roll in a radial direction, which passes through a contact region of the transfer roll and the coating roll, after transfer of the coating liquid to the coating roll from the transfer roll, thereby separating the transfer roll and the coating roll from each other; and revolution means, which causes the coating roll separated from the transfer roll to contact with the inner surface of the bearing base material and moves the coating roll along the inner surface of the bearing base material while causing the coating roll to rotate on its own axis in the state of contact, thereby applying the coating liquid transferred to the coating roll to the inner surface of the bearing base material to form the coating layer.

In the coated bearing manufacturing method and the coated bearing manufacturing apparatus described above, the multiplicity of recesses are formed on the roll surface of the transfer roll. When the roll surface of the transfer roll is immersed in the coating liquid in, for example, a coating liquid reservoir, the recesses are filled with the coating liquid. Thereafter, the doctor blade rubs against the roll surface of the transfer roll to remove a surplus coating liquid therefrom. Therefore, a state, in which the coating liquid adheres uniformly to the roll surface of the transfer roll, is brought about, and the coating liquid of uniform thickness spreads also over a surface of the coating roll, to which the coating liquid is transferred from the transfer roll.

After the transfer roll and the coating roll rotate while being contact with each other to have the coating liquid transferred to the coating roll from the transfer roll, the coating roll is separated from the transfer roll so as to apply the coating liquid to an inner surface of a half bearing. At this time, according to the invention, the coating roll is moved relative to the transfer roll in a direction of rotation of the coating roll in a region in contact with the transfer roll while the transfer roll is moved relative to the coating roll in a radial direction, which passes through a contact region of the transfer roll and the coating roll, whereby the transfer roll and the coating roll are separated from each other.

The following three configurations are conceivable as configurations, in which the both rolls are moved to realize the system of separation. The first configuration is one (first configuration), in which both the transfer roll and the coating roll are moved, the second configuration is one (second configuration), in which only the transfer roll is moved, and the third configuration is one (third configuration), in which only the coating roll is moved.

FIG. 5 shows the first configuration. In this configuration, assuming that the transfer roll 1 and the coating roll 2 respectively rotate in an arrow A direction and in an arrow B direction, the transfer roll 1 is moved in a radial direction (an arrow C direction) passing through a contact region S of the both rolls 1, 2 and the coating roll 2 is moved in a direction (an arrow D direction) of rotation of the both rolls 1, 2 in the contact region S of the both rolls 1, 2. The coating roll 2 is driven by the transfer roll 1 to rotate on its own axis.

In the first configuration of separation, the coating roll 2 is first moved (the arrow D direction) relative to the transfer roll 1 toward that side of the roll surface, for which application of a coating liquid is finished, so that such movement does not lead to formation of a pool of the coating liquid on the roll surface of the transfer roll 1. On the other hand, in the case where the coating roll 2 is not moved toward that side, for which application of the coating liquid is finished, but the transfer roll 1 is moved in the radial direction (the arrow C direction), locations, in which the coating liquid stays locally, are generated on the roll surface of the transfer roll 1 and the roll surface of the coating roll 2. Generation of such pool of the coating liquid can be prevented by moving the coating roll 2 in the arrow D direction. Since the coating roll 2 is moved in the arrow D direction while rubbing slightly against the roll surface of the transfer roll 1, which moves in the arrow C direction, the coating liquid is broken well and less likely to be collected in the contact region S of the both rolls 1, 2 due to the viscosity thereof.

FIGS. 6 and 7 respectively show the second and third configurations, in which only the transfer roll 1, or only the coating roll 2 is moved instead of movements of the both rolls 1, 2 in the first configuration. The transfer roll 1 being moved obliquely upward as indicated by an arrow E in that case of FIG. 6, in which only the transfer roll 1 is moved, and the coating roll 2 is moved obliquely downward as indicated by an arrow F in that case of FIG. 7, in which only the coating roll 2 is moved. In the second and third configurations in FIGS. 6 and 7, it is possible to produce the same effect of preventing the coating liquid from staying as that in the first configuration.

The effect, produced by the recesses on the roll surface of the transfer roll, of uniformly applying the coating liquid to the coating roll and the effect, produced by the separating movements of the both rolls, of preventing the coating liquid from staying locally on the coating roll combine together to enable the coating roll to form a coating layer of uniform thickness on an inner surface of a bearing base material.

The respective recesses (called cell) on the roll surface of the transfer roll comprise a very small one in the form of, for example, a quadrangular pyramid. Preferably, the recesses are not connected to one another but independent individually. Being independent, an amount of a coating liquid held in each recess is set constant. Thereby, a coating liquid being transferred to the coating roll can be made further uniform in thickness.

Preferably, a total content volume of the recesses on the transfer roll is 5 cm$^3$/m$^2$ to 40 cm$^3$/m$^2$. FIG. 8 is a graph indicating the relationship between a total content volume of recesses per unit area of a transfer roll and a film thickness of a coating layer in the case where a coating liquid is transferred to a coating roll from a transfer roll and then applied to an inner surface of a half bearing by the coating roll to form a coating layer. It is understood from the graph of FIG. 8 that until a total content volume of the recesses reaches around 5 cm$^3$/m$^2$ to 40 cm$^3$/m$^2$, the film thickness of a coating layer can be controlled by changing the total content volume of the recesses. When 40 cm$^3$/m$^2$ is exceeded, a coating layer is not increased in film thickness even when the content volume increases, and a predetermined thickness results, so that a total content volume of the recesses preferably has an upper limit of 40 cm$^3$/m$^2$.

When a coating liquid is transferred to a coating roll from a transfer roll, the coating roll preferably rotates while being in contact with the transfer roll over one or more revolutions. The coating roll is pushed against the transfer roll at an appropriate pressure to rotate mutually whereby a coating liquid is transferred to the coating roll from the recesses on a roll surface of the transfer roll. At this time, the coating roll makes one or more revolutions whereby a coating liquid is transferred uniformly to the coating roll further favorably. That is, the reason for this is that in the case where a coating liquid is provisionally transferred from the transfer roll in a first revolution of the coating roll and a region, in which the coating liquid is thin in thickness, is generated on a surface of the coating roll, the coating liquid is transferred to such region from the transfer roll in subsequent revolutions and the coating liquid on the surface of the coating roll is made uniform in thickness.

A roll surface of a coating roll preferably has a hardness of Hs 30 to 80. Half bearings are designed to have necessary dimensions and assume a necessary shape in a state of being assembled to a housing of a connecting rod or the like with a predetermined clamping force. Therefore, preferably, a roll surface of a coating roll is elastically deformed to absorb dispersion of individually different half bearings in surface shape according to circumstances. By having a roll surface of a coating roll having a hardness of Hs 30 to 80, a coating roll can absorb such dispersion of half bearings in surface shape, thus enabling contributing to making a coating layer uniform in film thickness.

Further, when a coating liquid is applied to a half bearing by a coating roll, the half bearing is preferably fixed to a jig. Provided that a half bearing is fixed to a jig, the half bearing can be put in a stable state and a coating liquid can In the same state as that, in which a half bearing is fixed to a housing, so that such fixation contributes further to making a coating layer uniform in film thickness.

DESCRIPTION OF THE PREFERRED EMBODIMENT

Figure 4:
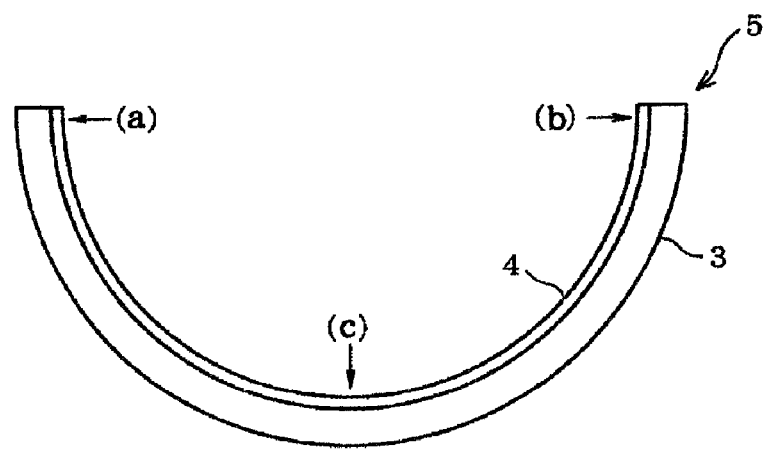
FIG. 4 is a side view showing a half bearing.
Figure 5:
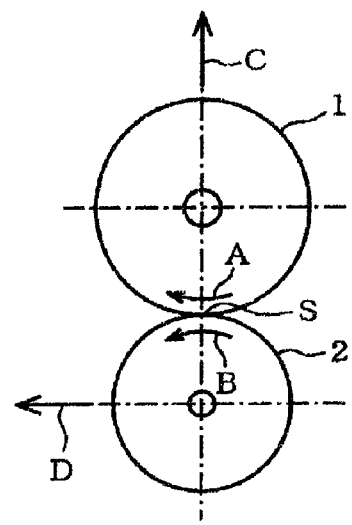
FIG. 5 is a schematic view showing a first configuration of a separating motion of the transfer roll and a coating roll.

An embodiment of the invention will be described below with reference to FIGS. 1 to 4. As shown in FIG. 4, according to the embodiment, an object, to which a coating liquid is applied, is a half bearing 5 formed by lining a bearing alloy layer 4 of Cu or Al on an inner surface of a back metal layer 3. A coating apparatus 6, by which the coating liquid is applied to an inner surface of the half bearing 5, is shown in FIG. 1 and mainly comprises a transfer roll 1 and a coating roll 2.

The transfer roll 1 is provided in a fixed position and rotationally driven in a predetermined speed about an axis 1a in an arrow A direction by a motor (not shown). A multiplicity of recesses, for example, recesses 7 in the form of a quadrangular pyramid shown in FIGS. 3A and 3B, in which recesses the coating liquid stays, are formed on a roll surface of the transfer roll 1 to be arranged adjacent to one another axially and circumferentially. The recesses 7 are independent of one another and no passages are present to connect between the recesses 7. The recesses 7 are set to have a length and a width, respectively, in the order of 50 μm to 500 μm and a depth in the order of 15 μm to 120 μm, and its total content volume is 5 $cm^3/m^2$ to 40 $cm^3/m^2$. A total content volume of the recesses 7 per unit area is appropriately determined in the range described above according to a film thickness of a coating layer applied to an inner surface of the half bearing 5.

Figure 2:
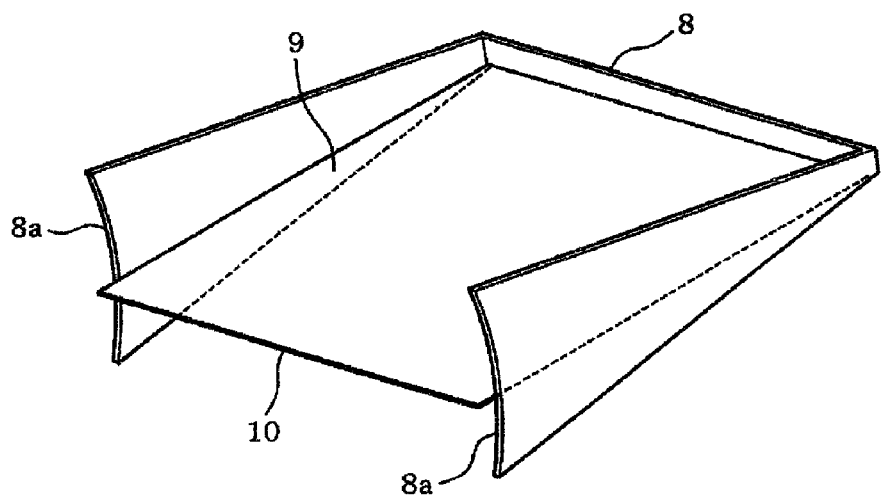
FIG. 2 is a perspective view simply showing a coating liquid tank.
Figure 3A:
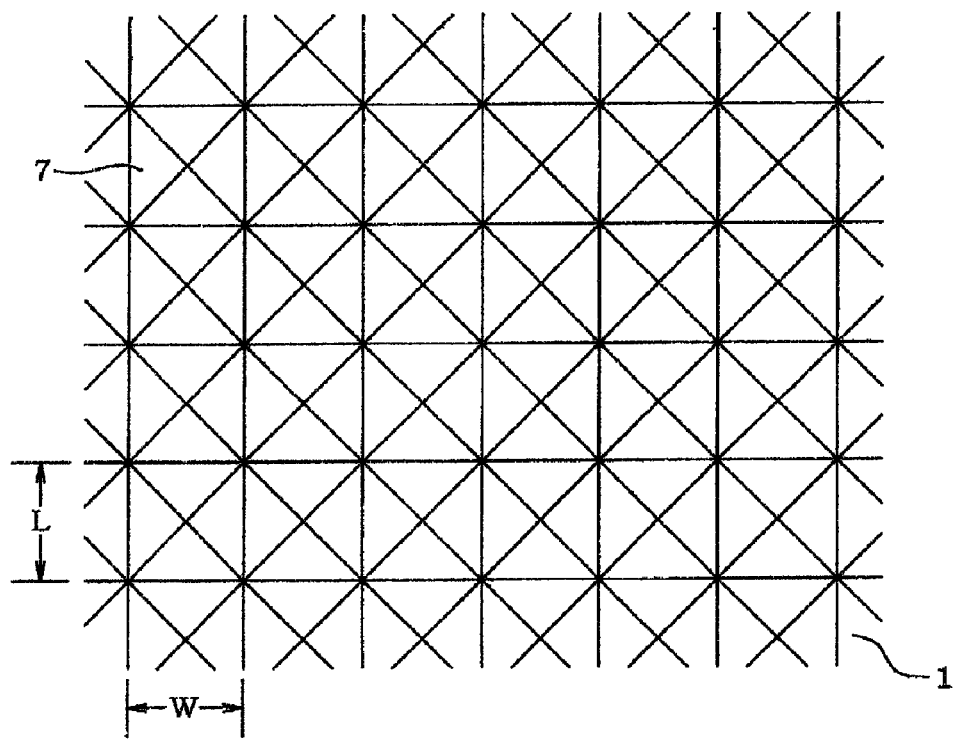
FIG. 3A is an enlarged view showing a roll surface of a transfer roll in development.
Figure 3B:
FIG. 3B is a cross sectional view of the roll surface of the transfer roll.

A coating liquid tank 8 is juxtaposed to the transfer roll 1. As shown in FIG. 2, a side of the coating liquid tank 8 toward the transfer roll 1 is opened. End surfaces 8a, 8a of both side walls on the left and right of the side thus opened are formed to make concavely curved surfaces having the same curvature as that of the roll surface of the transfer roll 1. Also, a bottom surface of the coating liquid tank 8 is formed of, for example, a thin metallic sheet 9. A tip end of the thin sheet 9 is protruded slightly from end surfaces 8a, 8a of the side walls of the coating liquid tank 8.

Figure 1:
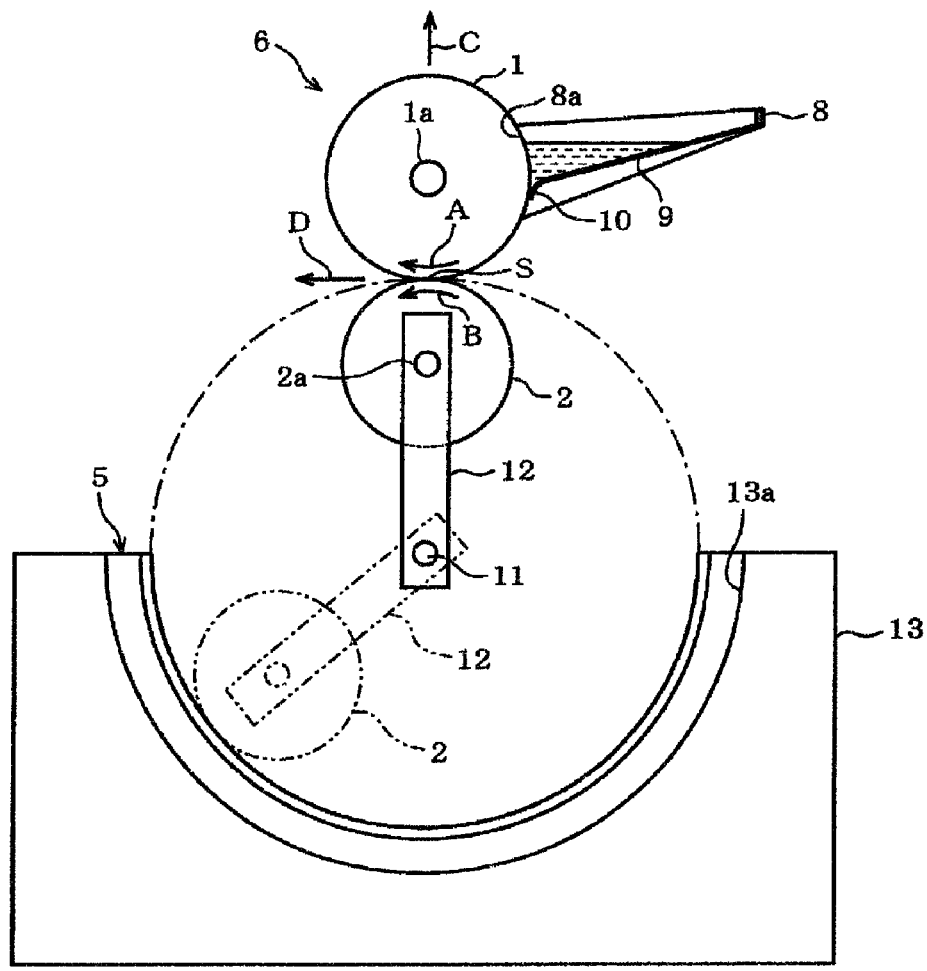
FIG. 1 is a view showing an outline construction of a coating apparatus according to an embodiment of the invention.

The coating liquid tank 8 functions as coating liquid supply means, from which the coating liquid is supplied to the transfer roll 1, and the concavely curved surfaces 8a, 8a are in contact with the roll surface of the transfer roll 1 as shown in FIG. 1. Accordingly, the opened side of the coating liquid tank 8 is configured to be closed by the transfer roll 1 and the roll surface of the transfer roll 1 is put in a state of being immersed in a coating liquid stored in the coating liquid tank 8. Also, the tip end of the thin sheet 9 is put into contact with the roll surface of the transfer roll 1 and is elastically deformed downwardly. The tip end of the thin sheet 9 functions as a doctor blade 10, which is caused by its own elastic restoring force to come into pressure contact with the roll surface of the transfer roll 1 to remove a surplus coating liquid from the roll surface when the transfer roll 1 rotates.

A liquid, for example, in which a solid lubricant is contained in a base resin and then it is diluted with an organic solvent is used as a coating liquid stored in the coating liquid tank 8. In addition, used as a base resin are thermosetting resins such as polyimide (PI), epoxy resin, phenol resin, etc., or a heat resistant resin such as polyamide imide (PAI), polybenzimidazole (PBI), etc. Also, used as a solid lubricant are molybdenum disulfide ($MoS_2$), graphite (Gr), polytetrafluoroethylene (PTFE), tungsten disulfide ($WS_2$), boron nitride (BN), etc. Preferably, the coating liquid is regulated to have a viscosity of 200 m·Pa/sec to 3000 m·Pa/sec, more preferably, 500 m·Pa/sec to 2000 m·Pa/sec.

The transfer roll 1 is made integral with the coating liquid tank 8 and moved vertically together with the coating liquid tank 8 by an elevating device. According to the embodiment, the transfer roll 1 rotates not only at the time of ascent and descent but also at all times and such rotation agitates the coating liquid stored in the coating liquid tank 8. Owing to the agitation, the coating liquid is generally maintained in a homogeneous state without generation of demixing.

On the other hand, a roll surface of the coating roll 2 is finished to be made a smooth surface. The coating roll 2 is rotatably supported below the transfer roll 1 by a shaft 2a at a tip end of an arm 12 capable of circular motion (orbital motion) about a shaft 11. A rotating device (not shown) causes the arm 12 to perform the circular motion. In a state, in which the arm 12 revolves right above, the roll surface of the coating roll 2 comes into contact at a predetermined pressure with the roll surface of the transfer roll 1. The roll surface of the coating roll 2 is formed from, for example, a relatively soft plastic to have a hardness of Hs 30 to 80. In addition, the arm 12 performs the circular motion with a motor (not shown) as a drive source to have the coating roll 2 perform the orbital motion.

A jig 13 is arranged below the shaft 11 of the arm 12. The half bearing 5 is detachably fixed to a semi-circular recess 13a of the jig 13. In a state, in which the half bearing 5 is fixed to the jig 13, the roll surface of the coating roll 2, which is caused by the arm 12 to perform the circular motion (orbital motion), comes into contact with an inner peripheral surface of the half bearing 5. When the coating roll 2 comes into contact with the inner peripheral surface of the half bearing 5, the coating roll 2 is acted by torque to revolve while rotating on its own axis.

The elevating device, which moves the transfer roll 1 up and down, and the rotating device, which causes the coating roll 2 to perform the circular motion, function as separation means for separating the transfer roll 1 and the coating roll 2, as understood from the following description. Also, the rotating device functions as revolving means, which moves the coating roll 2 along the inner surface of the half bearing 5.

Subsequently, an operation in the case where the coating apparatus 6 is used to apply a coating liquid to the inner surface of the half bearing 5 will be described. First, the coating liquid is stored in the coating liquid tank 8. Also, the half bearing 5 is fixed to the jig 13. The transfer roll 1 is stopped at a lowermost position and the arm 12 is stopped at a position, in which it is turned vertically upward, to bring the coating roll 2 into contact with a lower side of the transfer roll 1. The transfer roll 1 is being rotationally driven by a motor (not shown) and when the coating roll 2 comes into contact with the transfer roll 1, the coating roll 2 receives torque from the transfer roll 1 to rotate.

Out of the transfer roll 1 and the coating roll 2, which are in contacting rotation, the transfer roll 1 is immersed in the coating liquid stored in the coating liquid tank 8, so that the recesses 7 are filled with the coating liquid. When that part of the recesses 7 of the transfer roll 1, which is filled with the coating liquid, rotates in the arrow A direction and is exposed downward from the coating liquid tank 8, the doctor blade 10 scrapes off a surplus coating liquid on the roll surface (coating liquid adhering process).

The coating roll 2 comes into contact with the roll surface of the transfer roll 1, from which the surplus coating liquid is scraped off, to rotate whereby the coating liquid in the recesses 7 is transferred to the coating roll 2. Even if the coating liquid just after transferred to the coating roll 2 is made concave-convex in shape under the influence of the recesses 7, such irregularity immediately disappears due to fluidity thereof and the coating liquid defines a smooth surface, which follows the roll surface of the coating roll 2.

When the transfer roll 1 and the coating roll 2, respectively, make one or more revolutions and the coating liquid is uniformly transferred to the roll surface of the coating roll 2, the transfer roll 1 is subsequently moved upward (an arrow C direction) by the elevating device (not shown). The arm 12 begins to rotate counterclockwise in FIG. 1 in a manner to interlock with the upward movement of the transfer roll 1.

Owing to rotation of the arm 12, the coating roll 2 is moved in an arrow D direction along a tangent line at a contact region S of the both rolls 1, 2. Thereby, the coating roll 2 is moved in the same direction as that of rotation thereof relative to the transfer roll 1, which is separating upward therefrom, so that the coating roll 2 separates from the transfer roll 1 without generation of a pool of the coating liquid, in which the coating liquid is increased locally in thickness, on the roll surface thereof (separation process). Therefore, the coating liquid transferred to the roll surface of the coating roll 2 forms a coating liquid transfer film having a uniform thickness over a whole periphery thereof.

After the coating roll 2 is separated from the transfer roll 1, the arm 12 also rotates counterclockwise. Thereby, the coating roll 2 comes into contact with the Inner surface of the half bearing 5, which is fixed to the jig 13. Then, the coating roll 2 moves along the inner peripheral surface of the half bearing 5 while rotating on its own axis, so that the coating liquid on the roll surface of the coating roll 2 is applied to the inner peripheral surface of the half bearing 5 to form a film as a coating layer (coating process). Thereafter, the arm 12 turns up to a state, in which it faces just upward, and brings the coating roll 2 into contact with the transfer roll 1, which descends to the lowermost position, to prepare for application of the coating liquid to a subsequent half bearing 5.

That half bearing 5, to an inner surface of which the coating liquid is applied, is removed from the jig 13 and conveyed to a drying oven and a kiln in order where drying and baking of a coating layer are carried out.

In this manner, according to the embodiment, it is possible to uniformly transfer the coating liquid to the roll surface of the coating roll 2, thus enabling forming a coating layer of uniform thickness on the half bearing 5. In order to confirm the effect of the invention, the inventors of the present application have made measurements with respect to the case where (product of embodiment) a coating layer is formed by the invention and the case where (product of comparison) a coating layer is formed by a conventional method. The following TABLE 1 indicates results of measurements on the product of embodiment and the product of comparison.

TABLE 1

|  | film thickness | | | uneven portion |
| --- | --- | --- | --- | --- |
|  | end (a) | center (c) | end (b) | (μm) |
| product of embodiment | 5 | 5 | 5 | None |
| product of comparison | 2 | 5 | 2 | 8 |

The conventional method is the same as that described in JP-A-2001-304264 and as follows. That is, a coating liquid is first supplied to a roll surface of a transfer roll, the transfer roll and a coating roll are caused to rotate in contact with each other, and the coating liquid is caused to uniformly spread on a surface of the coating roll. Thereafter, the coating roll is separated from the transfer roll to interpose a half bearing between it and a backup roll, and the coating roll and the backup roll are rotated to apply the coating liquid, which spreads on the surface of the coating roll, to an inner surface of the half bearing.

In TABLE 1, locations, in which measurements of film thickness are made, on a half bearing 5 in FIG. 4 include an end (a) in a location (a) near to one end in a circumferential direction, a center (c) in a location (c) centrally in the circumferential direction, and an end (b) in a location (b) near to the other end in a circumferential direction. Also, measurements of film thickness are made wholly in the circumferential direction and locations, in which changes in film thickness are large, are represented as uneven portions in terms of differences of film thickness between maximum and minimum dimensions.

As seen from TABLE 1, the product of comparison is small in film thickness in the locations (a), (b) near the both ends as compared with the center thereof. The reason for this is that when interposition, of a half bearing between the coating roll and the backup roll begins and when the half bearing leaves from between the both rolls, a contact area between the coating roll and the half bearing is small and contact pressure is varied, so that a tendency, in which the film thickness decreases, exhibits itself. Also, an uneven portion is considerably varied in film thickness, which seems that a pool or pools of the coating liquid are generated on the coating roll to form the uneven portion.

In contrast, with the product of embodiment, locations (a), (b) near to both ends of a half bearing can be made equivalent in film thickness to that in a center (c) and no uneven portion is generated, from which it is understood that the coating method according to the invention is excellent in formation of a coating layer having a uniform thickness.

In addition, the invention is not limited to the embodiment described above and shown in the drawings but the following extension or changes are possible.

Figure 6:
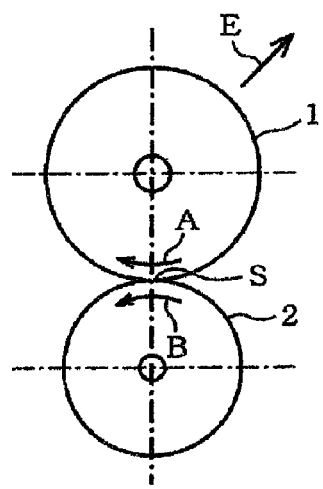
FIG. 6 is a schematic view showing a second configuration of a separating motion of the transfer roll and a coating roll.
Figure 7:
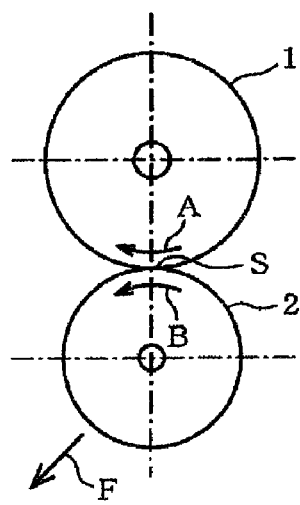
FIG. 7 is a schematic view showing a third configuration of a separating motion of the transfer roll and a coating roll.
Figure 8:
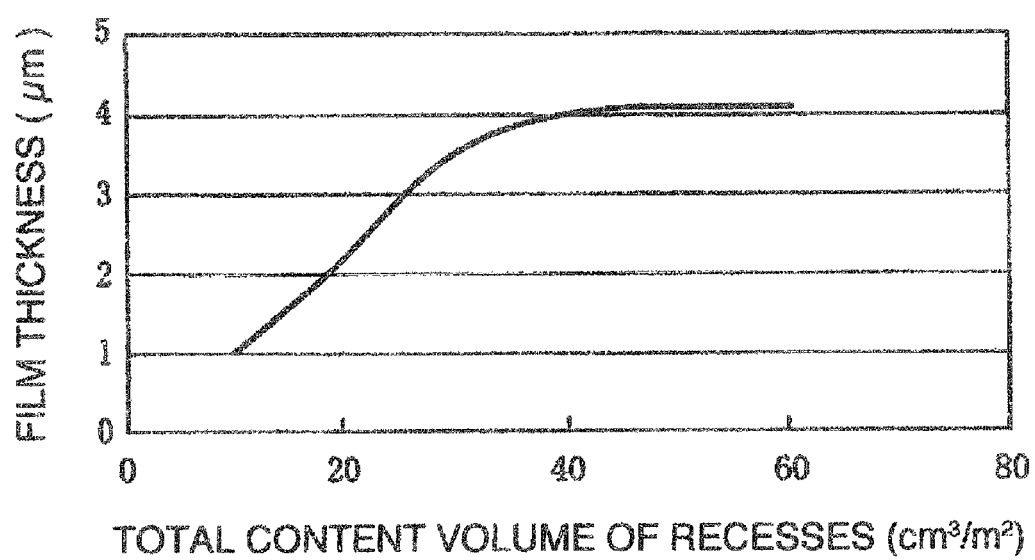
FIG. 8 is a graph indicating the relationship between a total content volume of recesses per unit area of a roll surface and a film thickness of a coating layer.

The transfer roll 1 and the coating roll 2 may be separated from each other by moving only the transfer roll 1 obliquely upward as shown in FIG. 6, or moving only the coating roll 2 obliquely downward as shown in FIG. 7.

A bearing base material, to which a coating liquid is applied, may be cylindrical-shaped. In such e, it suffices to enable the coating roll 2 to move together with the arm 12 also along the shaft 11, which axial movement causes the coating roll 2 and the arm 12 to be arranged in the cylindrical-shaped bearing and makes the arm 12 perform a circular motion.

The invention claimed is:

1. A coated bearing manufacturing method of applying a coating liquid to an inner surface of a cylindrical-shaped or semicylindrical-shaped bearing base material to form a coating layer, the method comprising:
    adhering the coating liquid to a roll surface of a transfer roll, which roll surface is formed with a multiplicity of recesses, and using a doctor blade to remove a surplus coating liquid from the roll surface;
    thereafter rotating the transfer roll and a coating roll, while bringing the rolls into contact with each other, to transfer the coating liquid on the transfer roll to the coating roll;
    moving the coating roll relative to the transfer roll in a direction of rotation of the coating roll in a region in contact with the transfer roll while moving the transfer roll relative to the coating roll in a radial direction, which passes through a contact region of the transfer roll and the coating roll, whereby the transfer roll and the coating roll are separated from each other to terminate transfer of the coating liquid to the coating roll from the transfer roll; and
    thereafter bringing the coating roll into contact with the inner surface of the bearing base material and moving the coating roll along the inner surface of the bearing base material while causing the coating roll to rotate on its own axis in the state of contact, whereby the coating liquid transferred to the coating roll is applied to the inner surface of the bearing base material to form the coating layer.

2. The coated bearing manufacturing method according to claim 1, wherein the multiplicity of recesses formed on the roll surface of the transfer roll have no passages connecting one another.

3. The coated bearing manufacturing method according to claim 1, wherein the multiplicity of recesses formed on the roll surface of the transfer roll have a total content volume of 5 to 40 $cm^3/m^2$.

4. The coated bearing manufacturing method according to claim 1, wherein when the coating liquid on the transfer roll is to be transferred to the coating roll, the coating roll makes one or more revolutions contacting with the transfer roll.

5. The coated bearing manufacturing method according to claim 1, wherein the roll surface of the coating roll has a hardness of Hs 30 to 80.

6. The coated bearing manufacturing method according to claim 1, wherein the coating roll applies the coating liquid to the bearing base material put in a state of being fixed to a jig.

* * * * *